UNITED STATES PATENT OFFICE.

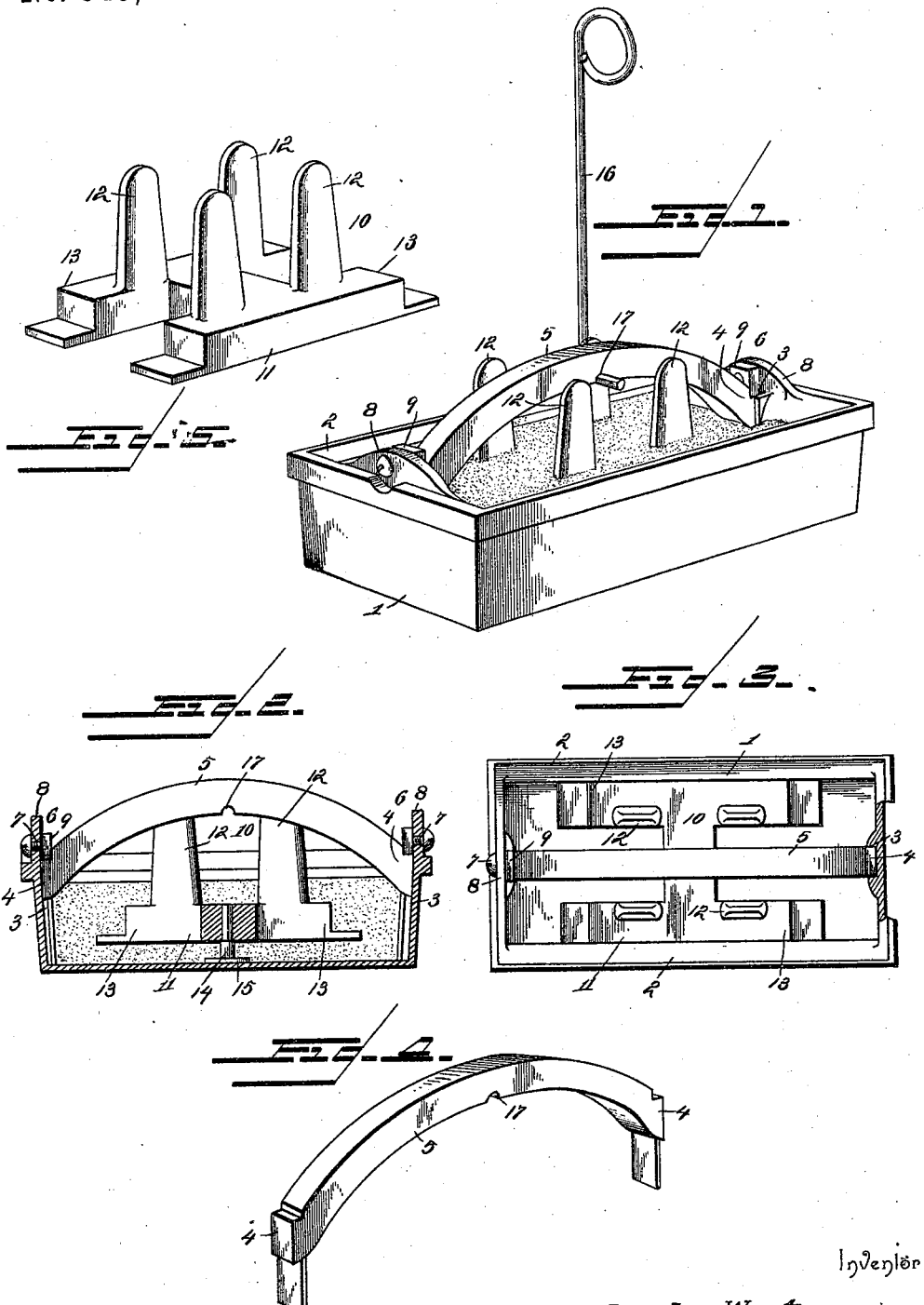

LYNDON WORSTER, OF HANNIBAL, NEW YORK.

FIRE-KINDLER.

SPECIFICATION forming part of Letters Patent No. 545,621, dated September 3, 1895.

Application filed May 23, 1895. Serial No. 550,389. (No model.)

*To all whom it may concern:*

Be it known that I, LYNDON WORSTER, a citizen of the United States, residing at Hannibal, in the county of Oswego and State of New York, have invented a new and useful Fire-Kindler, of which the following is a specification.

My invention relates to fire-kindlers, and has for its object to provide a simple, inexpensive, and efficient device adapted to be arranged in the fire-box of a stove, from which it may be removed with facility after the fire has been kindled, or at any time subsequent to use, the objects in view being to provide means for allowing free expansion and contraction of the several parts of the kindler without straining either the parts or the means whereby they are connected; to provide a combined agitator and guide whereby the porous or granular filling of the casing may be distributed preparatory to introducing the combustible agent and whereby the rod which is employed to remove the kindler from the fire-box is held in the proper position to engage and support the kindler without spilling the contents thereof, and, furthermore, to provide a supporting-bar with which a hooked rod may be engaged to remove the kindler from the fire-box.

Further objects and advantages of this invention will appear in the following description, and the novel features thereof will be particularly pointed out in the appended claims.

In the drawings, Figure 1 is a perspective view of the device constructed in accordance with my invention. Fig. 2 is a longitudinal section of the same. Fig. 3 is a plan view, partly in section. Fig. 4 is a detail view of the supporting-bar. Fig. 5 is a detail view of the agitator.

Similar numerals of reference indicate corresponding parts in all the figures of the drawings.

1 designates a pan or casing of any desired shape and size, preferably elongated, as shown in the drawings, the upper edge of the same being flared, as shown at 2. Formed in the end walls of this pan or casing are vertical grooves 3, in which are fitted heads 4 on the extremities of an arched supporting-bar 5, said supporting-bar extending longitudinally and centrally of the pan and being held at its extremities in the vertical grooves in the end walls of the pan by means of removable stops 6, formed by bolts 7, engaging perforated ears 8, rising from the end walls of the pan, and engaged at their inner ends by nuts 9. These nuts close the upper ends of the grooves in the end walls of the pan, and thus prevent the extremities of the supporting-bar from being accidentally detached from the pan.

Arranged in the pan is an agitator 10, consisting of a base 11, of approximately H shape, and pairs of twin upstanding spurs 12, which rise, respectively, upon opposite sides of the plane of the supporting-bar, and thereby hold the agitator from lateral displacement or accidental removal from the pan. The parallel arms of the base of the agitator are extended beyond the spurs to form projections 13, and depending from the center of the base is a supporting-stud 14, having an enlarged foot 15, which rests upon the bottom of the pan. The pan should be partly filled with sand, ashes, or other granular filling material, which may be distributed and settled in the pan by rocking the agitator, after which an inflammable agent—such as petroleum—is introduced to saturate this porous or granular filling, whereupon the kindler may be arranged in the fire-box of a stove and the combustible material ignited to fire either wood or coal. When it is desired to remove the kindler from the fire-box, a hooked operating-rod 16, as shown in operative position in Fig. 1, may be engaged with the supporting-bar, which is provided at its center with a shallow depression or notch 17, the upstanding arms or spurs of the agitator operating to guide the hooked end of the operating-rod to the proper part of the supporting-bar.

From the above description it will be seen that all of the parts of the kindler are connected so as to allow free expansion and contraction without detachment, and when necessary to replace a part or clean the kindler the members thereof may be readily disconnected by the removal of the stops arranged in the paths of the extremities of the supporting-bar.

Various changes in the form, proportion, and the minor details of construction may be resorted to without departing from the spirit or sacrificing any of the advantages of this invention.

Having described my invention, what I claim is—

1. A fire kindler having a pan or casing provided in opposite walls with vertical grooves, a supporting-bar having its terminals fitting in said grooves, and stops secured removably to the pan or casing in the paths of the terminals of the supporting-bar, substantially as specified.

2. A fire kindler having a pan or casing provided in opposite walls with vertical grooves, perforated ears arranged adjacent to the upper extremities of the grooves, bolts arranged in said perforated ears and engaged at their inner ends by nuts, and a supporting-bar having its terminals fitted in the grooves and held from displacement by the nuts on the inner ends of said bolts, substantially as specified.

3. A fire kindler having a pan or casing, a supporting-bar removably attached thereto, and an agitator arranged in the pan and provided with upstanding spurs or arms projecting, respectively, upon opposite sides of the plane of the supporting-bar, said agitator being adapted to be rocked in the pan to distribute filling material, substantially as specified.

4. A fire kindler having a pan or casing, a supporting-bar removably secured thereto, and an agitator having a base, upstanding spurs or arms arranged, respectively, upon opposite sides of the plane of the supporting-bar, and a depending supporting stud adapted to bear upon the bottom of the pan and upon which the agitator may be rocked to distribute filling material in the pan, substantially as specified.

5. A fire kindler having a pan or casing, a supporting-bar removably secured thereto and extending longitudinally of the pan, and an agitator comprising an approximately H-shaped base, pairs of upstanding spurs or arms arranged, respectively, upon opposite sides of the plane of the supporting-bar and adapted to engage said bar to prevent displacement of the agitator, and a depending supporting stud provided at its lower end with an enlarged foot to bear upon the bottom of the pan and upon which the agitator may be rocked to distribute filling material in the pan, substantially as specified.

In testimony that I claim the foregoing as my own I have hereto affixed my signature in the presence of two witnesses.

LYNDON WORSTER.

Witnesses:
F. V. NASH,
J. E. CASEY.